US012006728B2

(12) United States Patent
Lin

(10) Patent No.: US 12,006,728 B2
(45) Date of Patent: Jun. 11, 2024

(54) ANTI-THEFT STRUCTURE COMPOSED OF LOCK CORE AND KEY

(71) Applicant: Yu-Pin Lin, Tainan (TW)

(72) Inventor: Yu-Pin Lin, Tainan (TW)

( * ) Notice: Subject to any disclaimer, the term of this patent is extended or adjusted under 35 U.S.C. 154(b) by 296 days.

(21) Appl. No.: 17/649,066

(22) Filed: Jan. 27, 2022

(65) Prior Publication Data

US 2023/0235594 A1 Jul. 27, 2023

(51) Int. Cl.

*E05B 21/06* (2006.01)
*E05B 17/00* (2006.01)
*E05B 27/00* (2006.01)

(52) U.S. Cl.

CPC .......... *E05B 21/066* (2013.01); *E05B 17/002* (2013.01); *E05B 17/007* (2013.01); *E05B 27/0057* (2013.01)

(58) Field of Classification Search

CPC .... E05B 17/002; E05B 17/007; E05B 21/066; E05B 27/0057; E05B 29/00; E05B 29/0013; E05B 29/0033; E05B 29/0053; E05B 29/0066; E05B 27/0082; E05B 9/04; E05B 67/24; E05B 55/005; E05B 31/00; E05B 15/14; E05B 29/0026; Y10T 70/7599; Y10T 70/7633; Y10T 70/7616; Y10T 70/7706; Y10T 70/774; Y10T 70/7734

See application file for complete search history.

(56) References Cited

U.S. PATENT DOCUMENTS 3,581,534 A * 6/1971 Testa .................... E05B 29/004 70/383
4,062,211 A * 12/1977 Miller .................. E05B 21/066 70/366
4,359,886 A * 11/1982 Evans .................. E05B 21/066 70/366
5,765,417 A * 6/1998 Bolton .................. E05B 29/00 70/495
6,185,966 B1 * 2/2001 Chen .................... E05B 21/066 70/366
8,449,004 B1 * 5/2013 Wang .................... E05B 55/005 292/336.3

(Continued)

FOREIGN PATENT DOCUMENTS

CA 2266109 A1 * 9/1999 ......... E05B 47/0623
CA 2281245 A1 * 3/2000 ........... E05B 21/066

(Continued)

*Primary Examiner* — Christine M Mills
*Assistant Examiner* — Faria F Ahmad

(57) ABSTRACT

An anti-theft structure composed of a lock core composed of a lock core seat, a lock core shell, a push plate provided in a slide groove of the lock core shell, lock plates and washers alternately superimposedly provided in the lock core shell, a limiting plate and a positioning plate disposed on the lock core shell and placed in the lock core seat together with the shell, a latch lever, a brake bolt plate provided in an accommodating groove of the lock core seat, a compression spring provided in a groove of the lock core seat and pushing against the brake bolt plate, a positioning baffle provided in an accommodating chamber of the lock core seat and located at a bottom of the lock core shell, and a retaining ring embedded in a ring groove of the lock core seat; and a key provided with a ring groove.

1 Claim, 10 Drawing Sheets

(56) References Cited

U.S. PATENT DOCUMENTS

| | | | | |
|---|---|---|---|---|
| 2002/0112512 | A1* | 8/2002 | Li | E05B 29/0033 70/366 |
| 2005/0103072 | A1* | 5/2005 | Lee | E05B 29/0033 70/492 |
| 2006/0016230 | A1* | 1/2006 | Loughlin | E05B 37/10 70/366 |
| 2006/0096343 | A1* | 5/2006 | Loughlin | E05B 37/08 70/366 |
| 2007/0234768 | A1* | 10/2007 | Yamaguchi | E05B 17/04 70/379 R |
| 2009/0145186 | A1* | 6/2009 | Reese | E05B 21/066 70/380 |
| 2013/0229021 | A1* | 9/2013 | Wang | E05B 3/065 292/336.3 |
| 2015/0152666 | A1* | 6/2015 | Ho | E05B 29/00 70/353 |
| 2016/0186461 | A1* | 6/2016 | Wehr | E05B 21/066 70/359 |
| 2016/0186462 | A1* | 6/2016 | Wehr | E05B 19/00 70/391 |
| 2018/0171662 | A1* | 6/2018 | Lin | E05B 29/0066 |
| 2021/0381275 | A1* | 12/2021 | Wunderlich | E05B 19/0023 |
| 2023/0295956 | A1* | 9/2023 | Lin | E05B 21/066 70/20 |

FOREIGN PATENT DOCUMENTS

| | | | | | |
|---|---|---|---|---|---|
| EP | 1199425 | A2 * | 4/2002 | | E05B 21/066 |
| GB | 2129045 | A * | 5/1984 | | E05B 21/06 |
| TW | 0927802 | A1 * | 7/1999 | | E05B 21/066 |
| WO | WO-2014072570 | A1 * | 5/2014 | | E05B 19/0023 |
| WO | WO-2016072832 | A1 * | 5/2016 | | E05B 21/066 |
| WO | WO-2020178478 | A1 * | 9/2020 | | E05B 15/06 |

* cited by examiner

ANTI-THEFT STRUCTURE COMPOSED OF LOCK CORE AND KEY

BACKGROUND OF THE INVENTION

Field of Invention

The invention relates to an anti-theft structure composed of a lock core and a key, more particularly to an inner bottom surface of a lock core shell being provided with a push plate, and inside a lock core seat being provided with a brake bolt plate, so that the lock core cannot be rotated when a key is not completely inserted to reach the inner bottom surface of the lock core shell, thereby an optimum anti-theft efficacy can be achieved, and a limiting plate is disposed in the lock core seat capable of preventing the key from rotating when the key is not completely pulled out of the lock core, so that a key hole of each lock plate in the lock core will not be out of position, and when the key is inserted into the key hole of each of the lock plates again, the key can be inserted smoothly.

Related Art

For the lock core structure of a conventional disk tumbler lock, please refer to FIGS. 1 and 2. The conventional disk tumbler lock is mainly provided with a lock core 1 composed of a lock core seat 10, a lock core shell 11, a latch lever 12, a plurality of lock plates 13, a plurality of washers 14, and a positioning plate 15. The lock core seat 10 is provided with an accommodating chamber 100, an inner wall surface of the accommodating chamber 100 is provided with an embedding groove 101, and the latch lever 12 is embedded in the embedding groove 101. The lock core seat 10 is provided with a key insertion hole 102, the lock core shell 11 is disposed in the accommodating chamber 100 of the lock core seat 10, and a wall surface of the lock core shell 11 is provided with a cutting groove 110 and a notch 111. A part of the latch lever 12 is embedded in the cutting groove 110 of the lock core shell 11, the lock plates 13 and the washers 14 are alternately provided in the lock core shell 11. Each of the lock plates 13 is provided with a key hole 130, an outer edge of each of the lock plates 13 is provided with an arc notch 131, the arc notch 131 is provided for embedding the latch lever 12, the outer edge of each of the lock plates 13 is further provided with a protrusion 132, and the protrusion 132 is disposed in the notch 111 of the lock core shell 11. Each of the washers 14 is provided with a perforation 140, an outer edge of each of the washers 14 is provided with an arc notch 141, the arc notch 141 is provided for embedding the latch lever 12, the outer edge of each of the washers 14 is further provided with a flange 142, and the flange 142 is disposed in the notch 111 of the lock core shell 11. The positioning plate 15 is disposed at an end portion of the lock core shell 11, a key hole 150 is provided on the positioning plate 15, and two corresponding long edges of the key hole 150 are provided with a convex body 151 respectively. Thereby, the lock core structure of the conventional disk tumbler lock is formed, by inserting a key from the key insertion hole 102 of the lock core seat 10 into the key hole 150 of the positioning plate 15, the key hole 130 of each of the lock plates 13 and the perforation 140 of each of the washers 14 in the lock core shell 11, after a guide groove on the key is aligned with the convex bodies 151 on the positioning plate 15, and cut grooves on two opposite wall surfaces of the key are aligned with the positions of each of the lock plates 13 and each of the washers 14, the key can be rotated to drive the lock core shell 11 to rotate to achieve the unlocking and locking actions. However, if an incorrect key is inserted into the key hole 130 of each of the lock plates 13 in the lock core shell 11 of the conventional disk tumbler lock, each of the lock plates 13 can still be rotated about ninety degrees (that is, an angle of the notch 111 on the lock core shell 11). If a user does not fully insert the key to reach the inner bottom surface of the lock core shell 11 or a burglar turns the lock forcefully with an incorrect key, the key holes 130 of the lock plates 13 or the key will be deformed or broken easily, resulting in unsmooth rotation of unlocking and locking when the key is inserted into the lock core 1 again, and its anti-theft efficacy is easily reduced. Also, the lock plates 13 in the lock core shell 11 of the conventional disk tumbler lock will be rotated out of position (as shown in FIG. 2) due to the vibration generated by a moving vehicle after the key is pulled out, resulting in the key hole 130 on each of the lock plates 13 being unable to align with one another. When the key is inserted into the key holes 150, 130 again, the key must be joggled slightly and inserted slowly into the key hole 150 of the positioning plate 15 and the key hole 130 of each of the lock plates 13, until after the key hole 150 of the positioning plate 15 and the key hole 130 of each of the lock plates 13 are completely aligned, the key can be completely inserted to reach the inner bottom surface of the lock core shell 11 to rotate the lock core shell 11 to achieve an object of unlocking. Therefore, it is extremely inconvenient and troublesome to use the key to unlock or lock.

SUMMARY OF THE INVENTION

A main object of the invention is to provide an anti-theft structure composed of a lock core and a key capable of effectively solving the drawbacks of the conventional lock core and key in use.

An anti-theft structure composed of a lock core and a key of the invention comprising:

a lock core comprising a lock core seat, a lock core shell, a positioning plate and a latch lever, wherein an accommodating chamber is disposed in the lock core seat, an inner wall surface of the accommodating chamber is provided with an embedding groove, the lock core seat is provided with a key insertion hole, the lock core shell is disposed in the accommodating chamber of the lock core seat, a wall surface of the lock core shell is provided with a cutting groove and a notch, a plurality of lock plates and a plurality of washers are alternately superimposedly provided in the lock core shell, each of the lock plates is provided with a key hole, an outer edge of each of the lock plates is provided with an arc notch, the outer edge of each of the lock plates is further provided with a protrusion, the protrusion is disposed in the notch of the lock core shell, each of the washers is provided with a perforation, an outer edge of each of the washers is provided with an arc notch, the outer edge of each of the washers is further provided with a flange, the flange is disposed in the notch of the lock core shell, the positioning plate is disposed on an end portion of the lock core shell and placed into the accommodating chamber of the lock core seat, a key hole is provided on the positioning plate, two corresponding long edges of the key hole are provided with a convex body respectively, a part of the latch lever is embedded in the cutting groove of the lock core shell, and embedded in the arc notches of the lock plates and the washers, another part of the latch lever is embedded in the embedding groove of the lock core seat; and a key for inserting into the lock core, a guide groove being provided on two opposite wall surfaces of the key respectively, a plurality of tooth grooves being provided on the wall surface of the key, and each of the tooth grooves corresponding to a position of each of the lock plates of the lock core respectively;

characterized in that: a wall surface of the accommodating chamber of the lock core seat is provided with an accommodating groove, one side of the accommodating groove is provided with a shaft hole, another side of the accommodating groove is provided with a groove, inside the accommodating chamber of the lock core seat is annularly provided with a ring groove, an inner bottom surface of the lock core shell is provided with a slide groove, inside the slide groove is provided with a concave hole, a push plate is provided in the slide groove of the lock core shell, a perforation is provided on the push plate, a limiting plate is disposed between the lock core shell and the positioning plate, and disposed in the accommodating chamber of the lock core seat, the limiting plate is provided with a key hole, two corresponding long edges of the key hole are respectively provided with an arc groove, an outer edge of the limiting plate is provided with a protrusion, the protrusion is embedded in the embedding groove of the lock core seat, a brake bolt plate is provided in the accommodating groove of the lock core seat, one side of the brake bolt plate is provided with a pivot shaft, the pivot shaft is disposed in the shaft hole of the lock core seat, a compression spring is provided in the groove of the lock core seat, the compression spring pushes against the brake bolt plate, a positioning baffle is provided in the accommodating chamber of the lock core seat and is located at a bottom of the lock core shell, the positioning baffle is provided with a through hole, the positioning baffle is protrudingly provided with a first baffle corresponding to a position of the embedding groove of the lock core seat, the positioning baffle is protrudingly provided with a second baffle corresponding to positions of the accommodating groove and the groove of the lock core seat, a retaining ring is provided on an outer side of the positioning baffle, the retaining ring is embedded in the ring groove of the lock core seat, the key is provided with a ring groove, and the ring groove corresponds to a position of the limiting plate in the lock core.

The anti-theft structure composed of the lock core and the key of the invention has the advantages that: when the key is inserted into the lock core to unlock, the key must be completely inserted into the lock core before the key can be rotated to drive the lock core shell to rotate to form an unlocking mechanism, the key can be prevented from being rotated when the key is not completely pulled out of the lock core, so that the key hole of each of the lock plates in the lock core will not be out of position, and when the key is inserted into the key hole of each of the lock plates again, the key can be inserted smoothly, thereby achieving a long service life for the lock core and the key and an optimum anti-theft efficacy.

DETAILED DESCRIPTION OF THE INVENTION

Regarding the technical means adopted by the invention to achieve the above-mentioned object and efficacy, a preferred and feasible embodiment is explained in details hereunder in conjunction with the figures.

Figure 1:
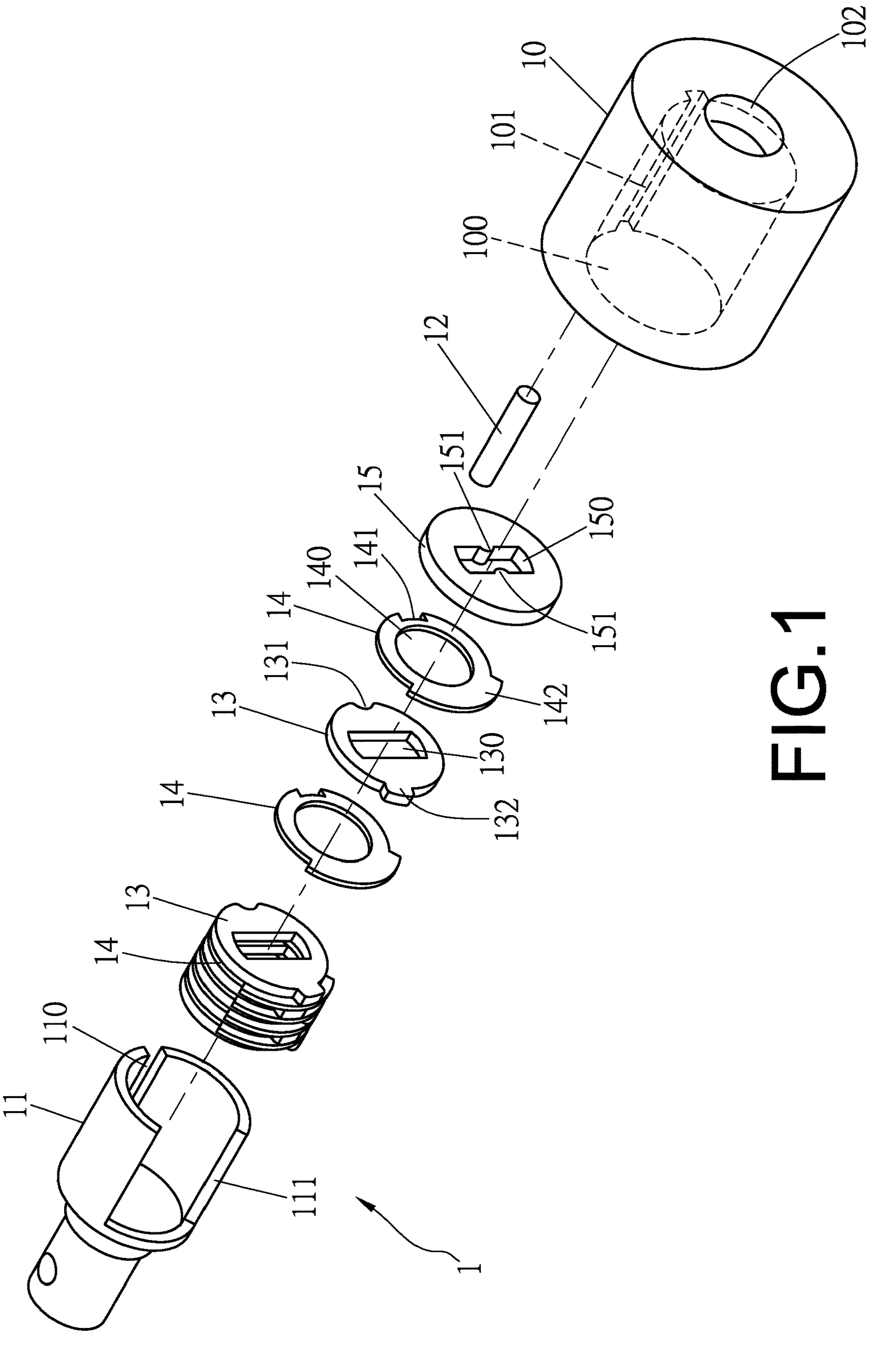
FIG. 1 is a perspective exploded view of a conventional lock core structure.
Figure 2:
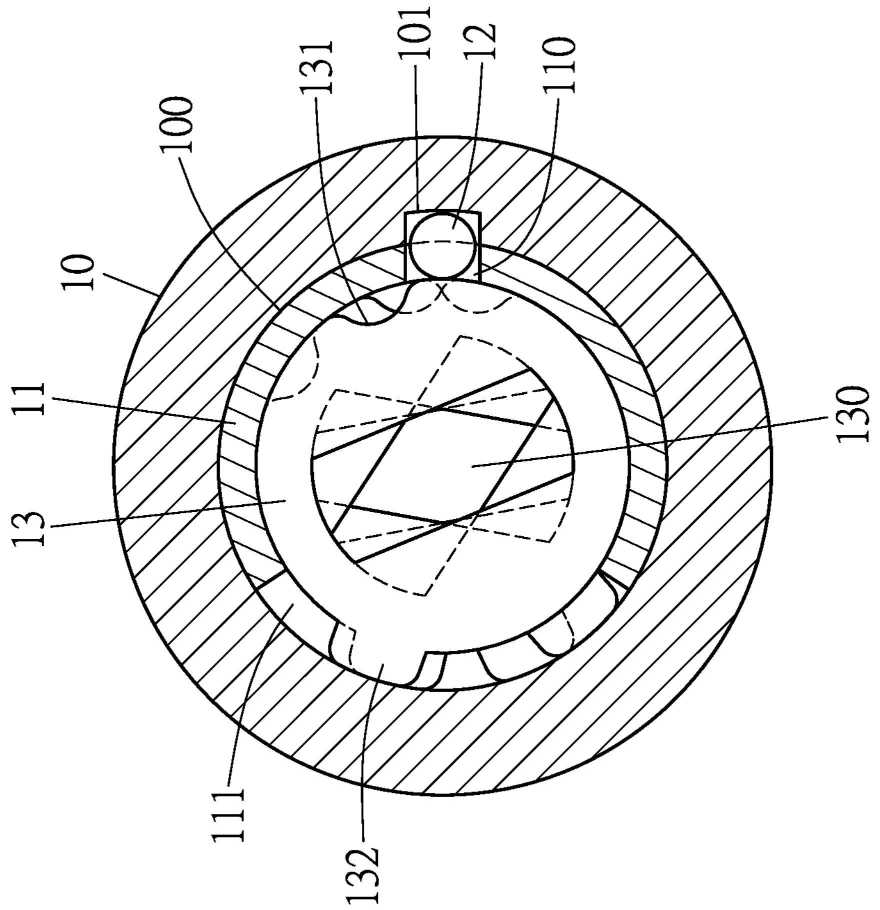
FIG. 2 is a cross-sectional view of the conventional lock core structure.
Figure 3:
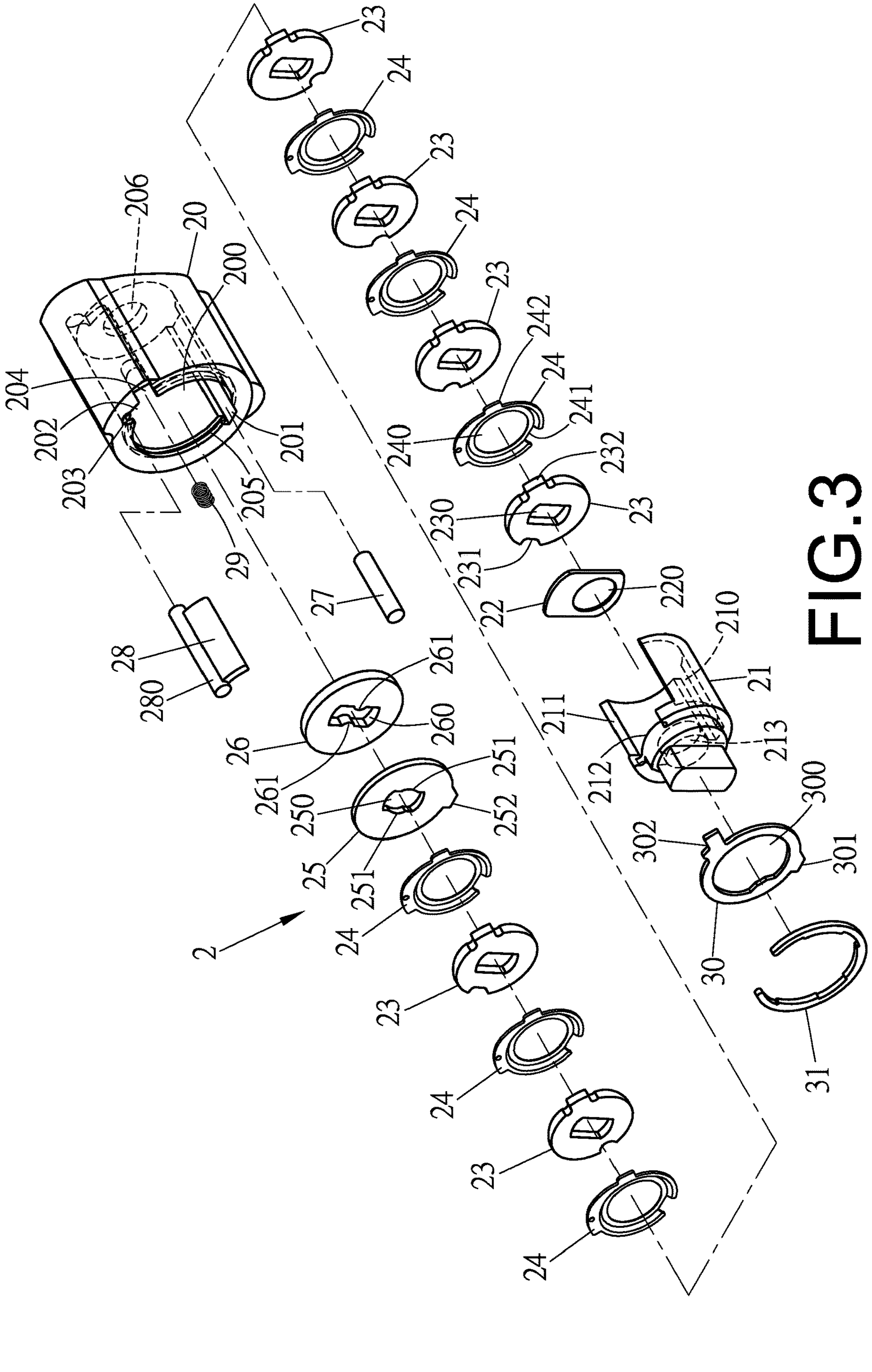
FIG. 3 is a perspective exploded view of one embodiment of the invention.
Figure 4:
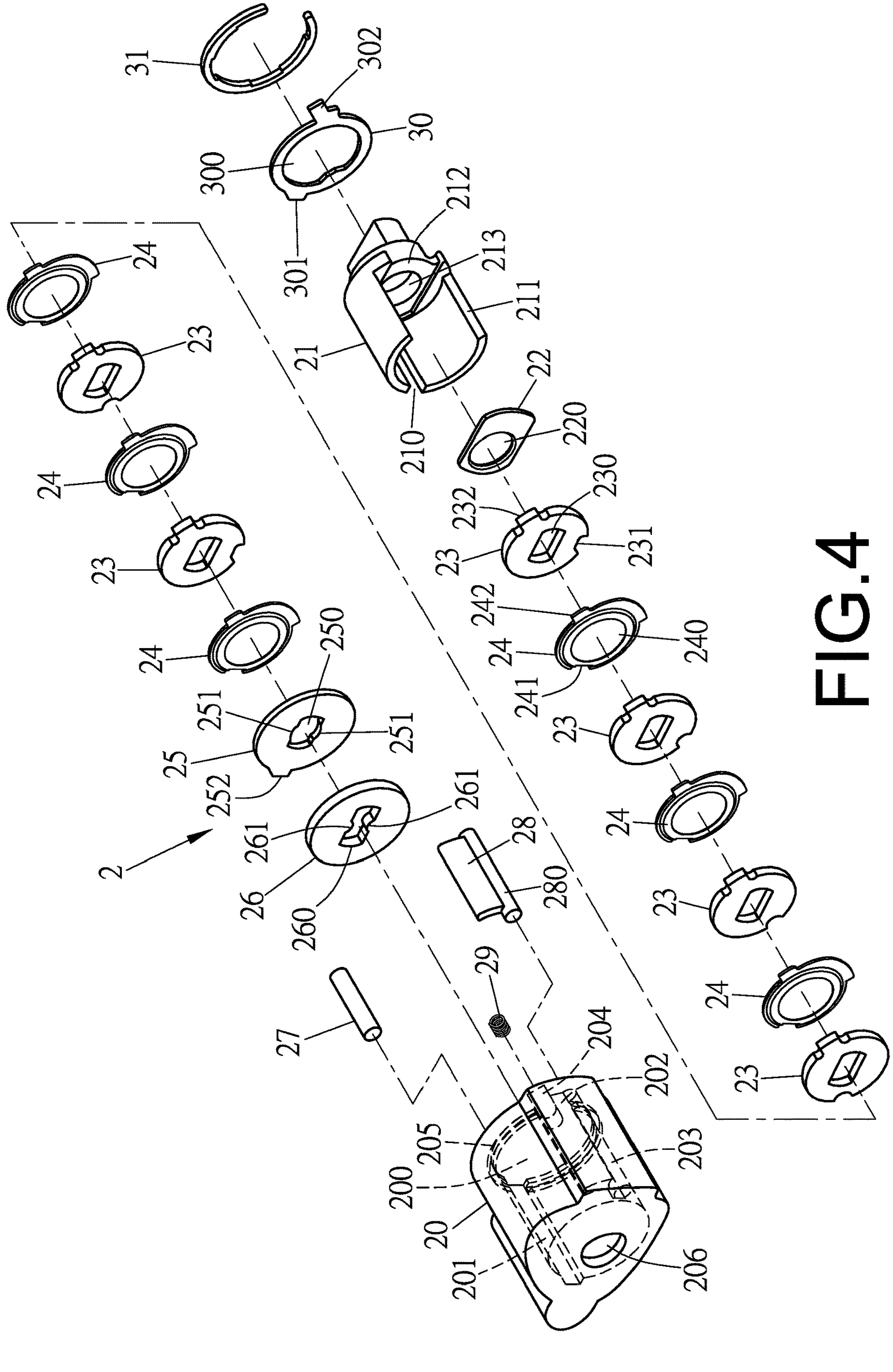
FIG. 4 is a perspective exploded view of a lock core from another angle of one embodiment of the invention.
Figure 5:
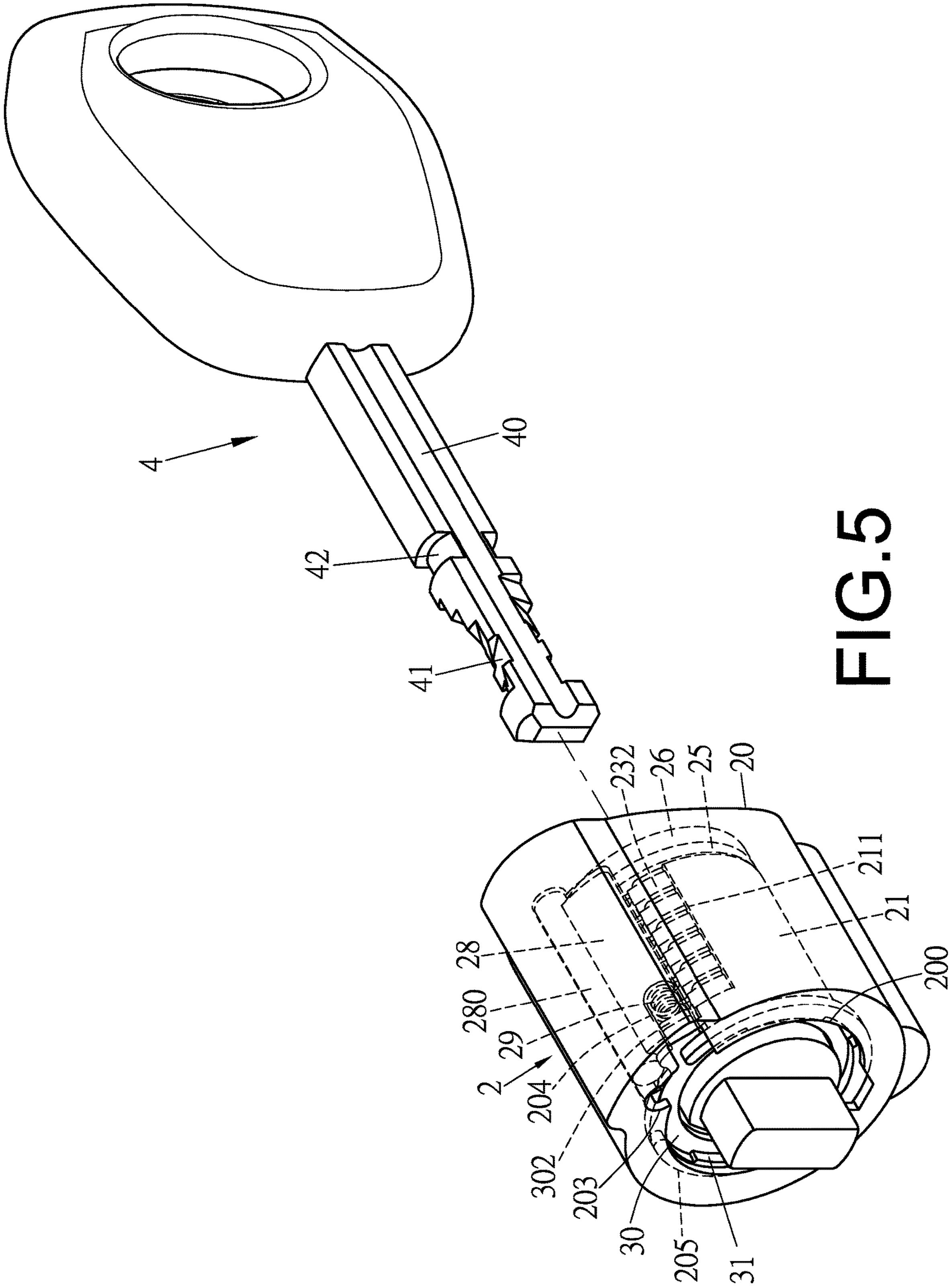
FIG. 5 is a perspective view of the lock core and a key of one embodiment of the invention.

Please refer to FIGS. 3 to 5 for one embodiment of the invention. An anti-theft structure composed of a lock core and a key of the invention is mainly provided with a lock core 2, the lock core 2 is composed of a lock core seat 20, a lock core shell 21, a push plate 22, a plurality of lock plates 23, a plurality of washers 24, a limiting plate 25, a positioning plate 26, a latch lever 27, a brake bolt plate 28, a compression spring 29, a positioning baffle 30 and a retaining ring 31. The lock core seat 20 is provided with an accommodating chamber 200, a wall surface of the accommodating chamber 200 is provided with an embedding groove 201, and the wall surface of the accommodating chamber 200 is further provided with an accommodating groove 202. One side of the accommodating groove 202 is provided with a shaft hole 203, another side of the accommodating groove 202 is provided with a groove 204, and inside the accommodating chamber 200 of the lock core seat 20 is annularly provided with a ring groove 205. The lock core seat 20 is provided with a key insertion hole 206, the lock core shell 21 is disposed in the accommodating chamber 200 of the lock core seat 20, and a wall surface of the lock core shell 21 is provided with a cutting groove 210 and a notch 211. An inner bottom surface of the lock core shell 21 is provided with a slide groove 212, inside the slide groove 212 is provided with a concave hole 213, the push plate 22 is provided in the slide groove 212 of the lock core shell 21, and a perforation 220 is provided on the push plate 22. The lock plates 23 and the washers 24 are alternately superimposedly provided in the lock core shell 21. Each of the lock plates 23 is provided with a key hole 230, an outer edge of each of the lock plates 23 is provided with an arc notch 231, the arc notch 231 is provided for embedding the latch lever 26, the outer edge of each of the lock plates 23 is further provided with a protrusion 232, and the protrusion 232 is disposed in the notch 211 of the lock core shell 21. Each of the washers 24 is provided with a perforation 240, an outer edge of each of the washers 24 is provided with an arc notch 241, the arc notch 241 is provided for embedding the latch lever 26, the outer edge of each of the washers 24 is further provided with a flange 242, and the flange 242 is disposed in the notch 211 of the lock core shell 21. The limiting plate 25 is disposed on an end portion of the lock core shell 21 and placed into the accommodating chamber 200 of the lock core seat 20, the limiting plate 25 is provided with a key hole 250, two corresponding long edges of the key hole 250 are respectively provided with an arc groove 251, and an outer edge of the limiting plate 25 is provided with a protrusion 252. The positioning plate 26 is disposed on an outer side of the limiting plate 25, a key hole 260 is provided on the positioning plate 26, and two corresponding long edges of the key hole 260 are provided with a convex body 261 respectively. A part of the latch lever 27 is embedded in the cutting groove 210 of the lock core shell 21, and another part of the latch lever 27 is embedded in the embedding groove 201 of the lock core seat 20. The brake bolt plate 28 is provided in the accommodating groove 202 of the lock core seat 20, one side of the brake bolt plate 28 is provided with a pivot shaft 280, the pivot shaft 280 is disposed in the shaft hole 203 of the lock core seat 20, the compression spring 29 is provided in the groove 204 of the lock core seat 20, and the compression spring 29 pushes against an end portion of the brake bolt plate 28. The positioning baffle 30 is provided in the accommodating chamber 200 of the lock core seat 20 and is located at a bottom of the lock core shell 21, the positioning baffle 30 is provided with a through hole 300, the positioning baffle 30 is protrudingly provided with a first baffle 301 corresponding to a position of the embedding groove 201 of the lock core seat 20, and the positioning baffle 30 is protrudingly provided with a second baffle 302 corresponding to positions of the accommodating groove 202 and the groove 204 of the lock core seat 20. The retaining ring 31 is provided on an outer side of the positioning baffle 30, and the retaining ring 31 is embedded in the ring groove 205 of the lock core seat 20. A key 4 is provided for inserting into the lock core 2, a guide groove 40 is provided on two opposite wall surfaces of the key 4 respectively, a plurality of tooth grooves 41 are provided on the wall surface of the key 4, and each of the tooth grooves 41 corresponds to a position of each of the lock plates 23 of the lock core 2 respectively. The key 4 is further provided with a ring groove 42, and the ring groove 42 corresponds to a position of the limiting plate 25 in the lock core 2. Thereby, the anti-theft structure composed of the lock core 2 and the key 4 of the invention is formed.

Please refer to FIGS. 3 to 6 for assembling the lock core 2. Firstly, place the push plate 22 into the slide groove 212 of the lock core shell 21, and then sequentially insert the lock plates 23 and the washers 24 into the lock core shell 21 alternately, the protrusion 232 of each of the lock plates 23 and the flange 242 of each of the washers 24 are aligned with one another and are disposed in the notch 211 of the lock core shell 21, and then a part of the latch lever 27 is embedded in the cutting groove 210 of the lock core shell 21. The limiting plate 25 and the positioning plate 26 are superimposedly disposed on the end portion of the lock core shell 21, the compression spring 29 is placed in the groove 204 of the lock core seat 20, and the brake bolt plate 28 is disposed in the accommodating groove 202 of the lock core seat 20. The pivot shaft 280 of the brake bolt plate 28 is disposed in the shaft hole 203 of the lock core seat 20, so that the brake bolt plate 28 is capable of rotating and swinging by using the pivot shaft 280 as a pivot point, and then the limiting plate 25, the positioning plate 26 and the lock core shell 21 assembled as described above are placed in the accommodating chamber 200 of the lock core seat 20. Another part of the latch lever 27 protruded on the lock core shell 21 and the protrusion 252 of the limiting plate 25 are embedded in the embedding groove 201 of the lock core seat 20. The end portion of the brake bolt plate 28 is pushed by the compression spring 29 to abut against wall surfaces of each of the lock plates 23 and each of the washers 24 located in the notch 211 in the lock core shell 21, and butt against the protrusion 232 of each of the lock plates 23 and the flange 242 of each of the washers 24, so that each of the lock plates 23 and each of the washers 24 can be retained and positioned. The positioning baffle 30 is disposed in the accommodating chamber 200 of the lock core seat 20. The bottom of the lock core shell 21 is inserted into the through hole 300 of the positioning baffle 30, the first baffle 301 of the positioning baffle 30 is embedded in the embedding groove 201 of the lock core seat 20 for positioning, and the second baffle 302 of the positioning baffle 30 is disposed in the accommodating groove 202 and the groove 204 of the lock core seat 20, so that the brake bolt plate 28 and the compression spring 29 can be retained and positioned. Then the retaining ring 31 is snapped into the ring groove 205 of the lock core seat 20, and the positioning baffle 30 is positioned in the accommodating chamber 200 of the lock core seat 20, thereby an entire assembly of the lock core 2 can be completed.

Figure 6:
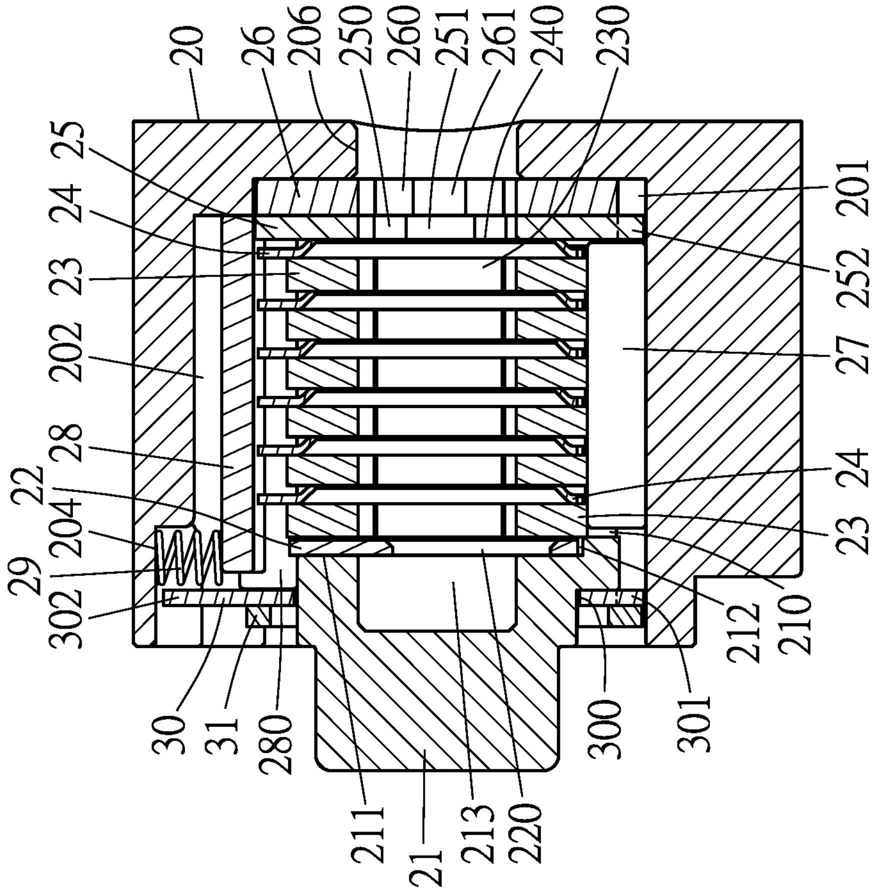
FIG. 6 is an assembled cross-sectional view of the lock core of one embodiment of the invention.
Figure 7:
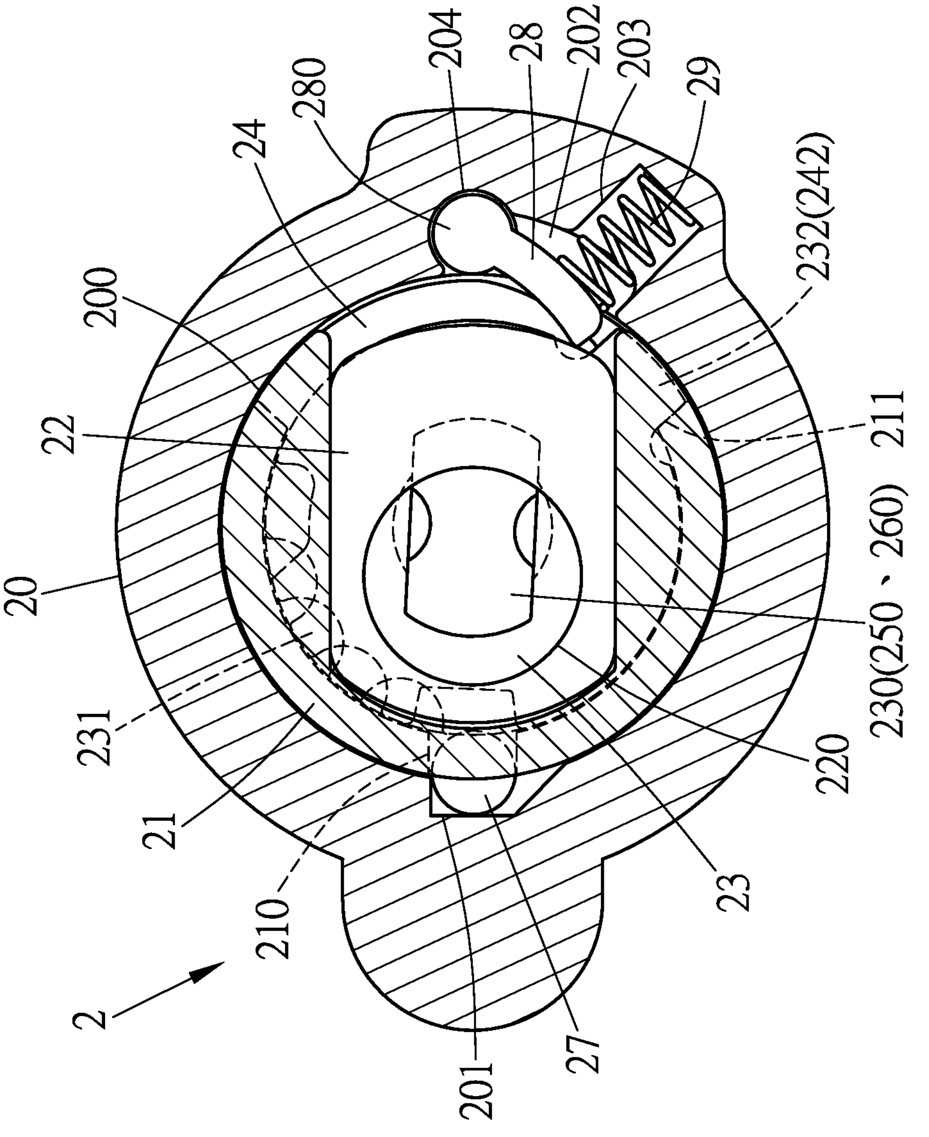
FIG. 7 is a cross-sectional view of the lock core without the key inserted according to one embodiment of the invention.
Figure 8:
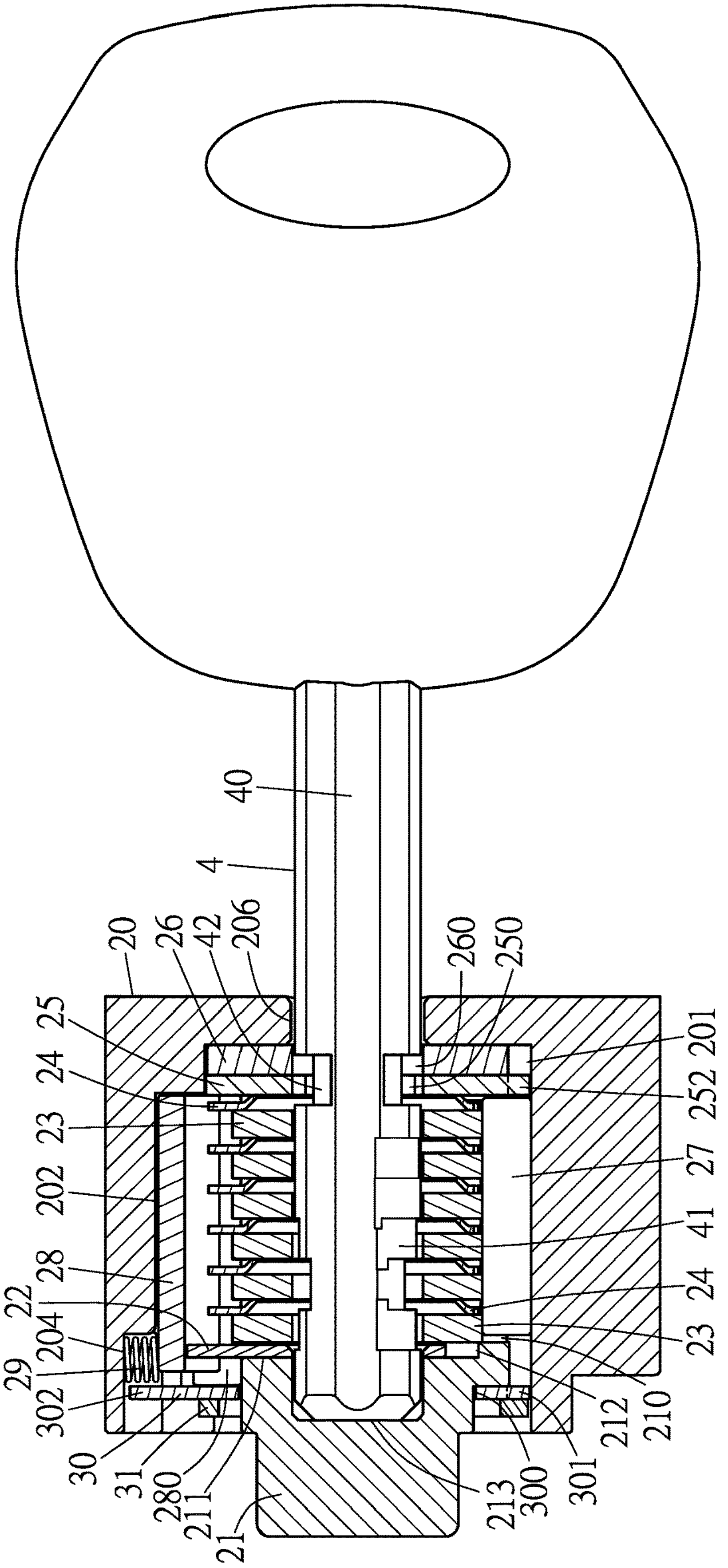
FIG. 8 is an assembled cross-sectional view of the key inserted into a key hole of the lock core according to one embodiment of the invention.
Figure 9:
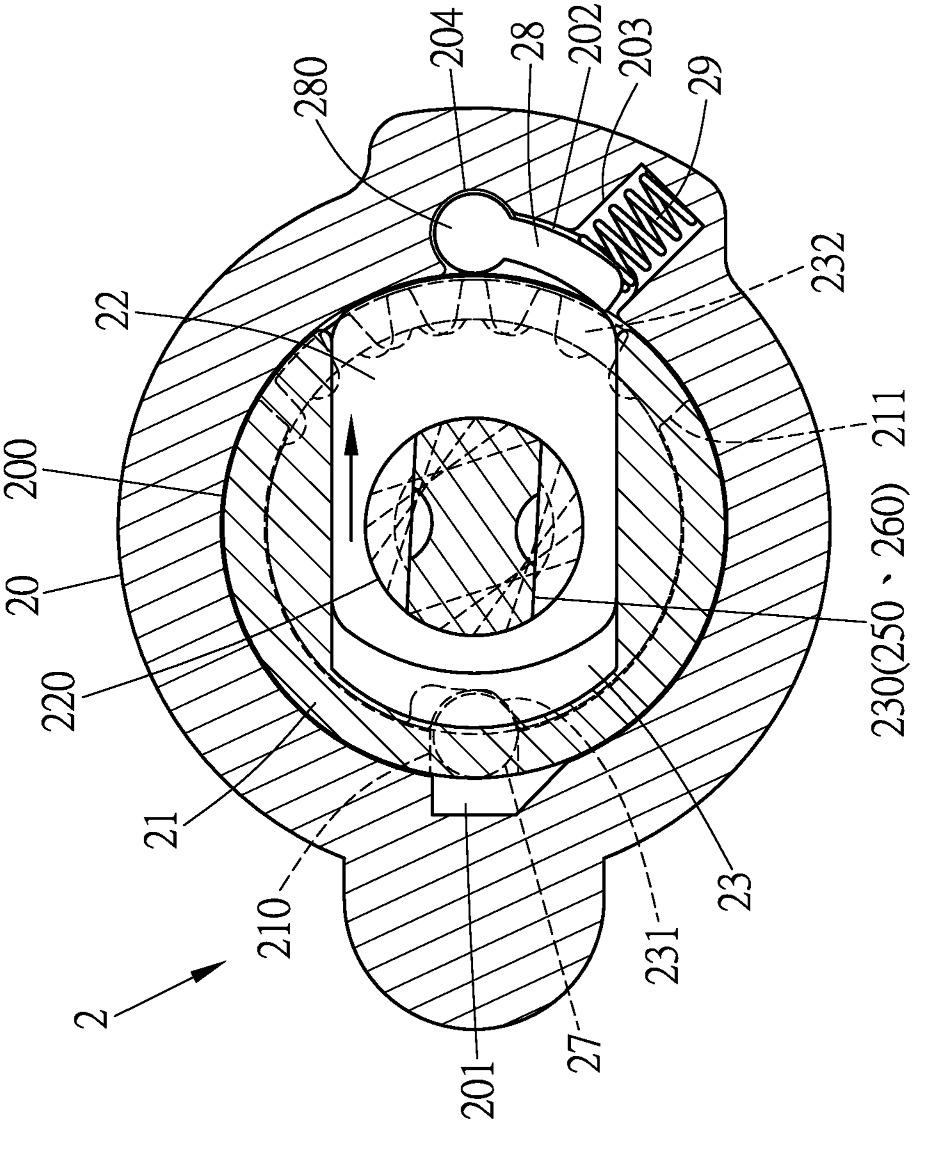
FIG. 9 is a cross-sectional view of the lock core with the key inserted into the key hole of the lock core according to one embodiment of the invention.

The lock core 2 of the invention can be assembled on various types of locks. Please refer to FIGS. 6 to 10 for using the lock core 2 and the key 4 of the invention. When unlocking, insert the key 4 into the key insertion hole 206 of the lock core seat 20, and then reach deep into the key hole 230 of each of the lock plates 23 and the perforation 240 of each of the washers 24 in the lock core shell 21 through the key holes 260 and 250 of the positioning plate 26 and the limiting plate 25. When a bottom end of the key 4 is inserted to reach the inner bottom surface of the lock core shell 21, by inserting the key 4 into the perforation 220 of the push plate 22, the push plate 22 is pushed by the bottom end of the key 4 to slide in the slide groove 212 of the lock core shell 21, an end portion of the push plate 22 pushes against the brake bolt plate 28 to rotate (as shown in FIGS. 8 and 9), the brake bolt plate 28 rotates and presses the compression spring 29 to make the compression spring 29 in an elastic compression state. After the brake bolt plate 28 is pushed by the push plate 22 to rotate and move into the accommodating groove 202, the protrusion 232 of each of the lock plates 23 and the flange 242 of each of the washers 24 are no longer blocked. In this way, the key 4 can be turned to drive the lock core shell 21 to rotate to complete the unlocking action. When the key 4 is not inserted into the lock core 2 (as shown in FIGS. 6 and 7), the protrusion 232 of each of the lock plates 23 and the flange 242 of each of the washers 24 in the lock core shell 21 are blocked by the brake bolt plate 28 and cannot be rotated (as shown in FIG. 7). When a user inserts the correct key 4 into the key insertion hole 206 of the lock core seat 20, the key hole 250 of the limiting plate 25, the key hole 260 of the positioning plate 26, and the key hole 230 of each of the lock plates 23, if the key 4 is not inserted to reach the bottom, the protrusion 232 of each of the lock plates 23 and the flange 242 of each of the washers 24 are still blocked by the brake bolt plate 28 and cannot be rotated, so the key 4 must be inserted to reach the inner bottom surface of the lock core shell 21, the push plate 22 is pushed by the bottom end of the key 4 to slide, the push plate 22 pushes against the brake bolt plate 28 to rotate, the protrusion 232 of each of the lock plates 23 and the flange 242 of each of the washers 24 are no longer blocked, so that the key

Figure 10:
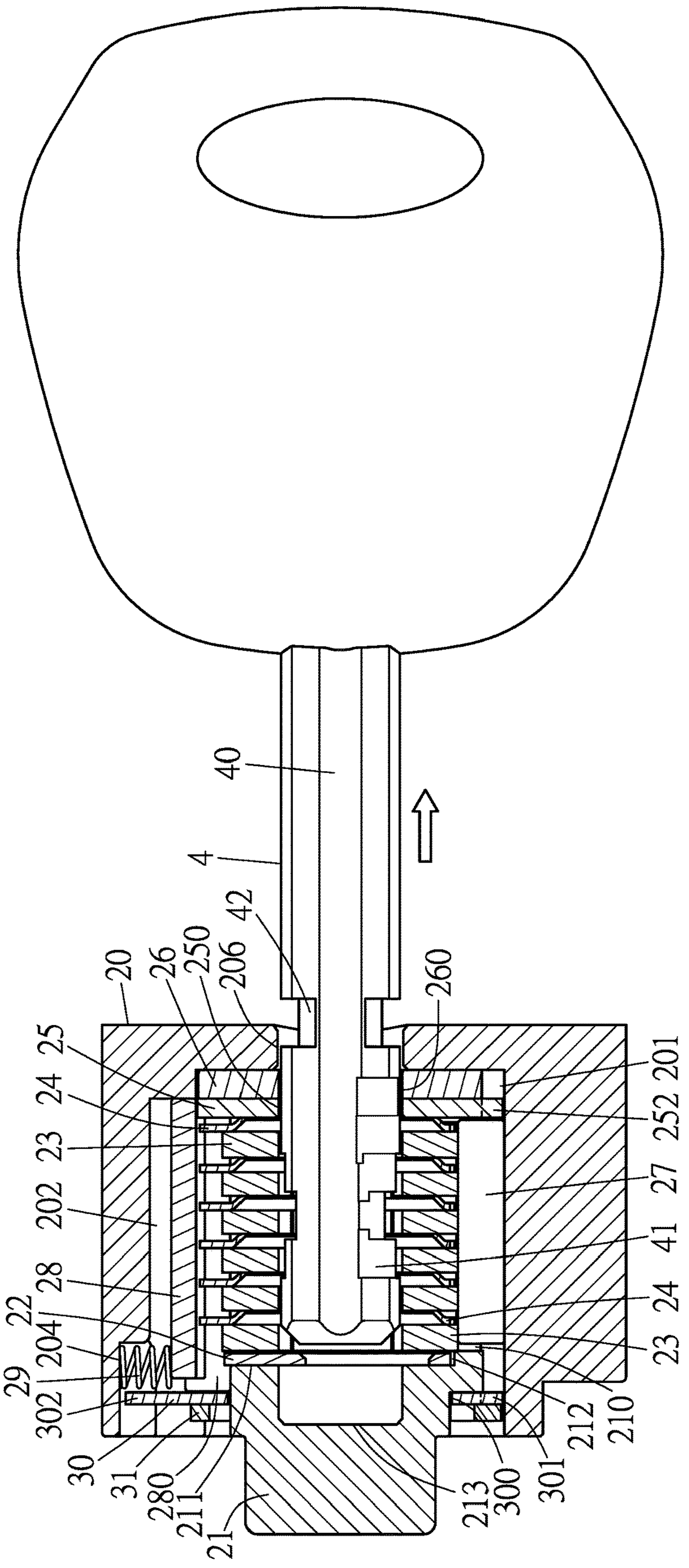
FIG. 10 is a cross-sectional view of the key being pulled out of the lock core according to one embodiment of the invention.

4 can be turned to drive the lock core shell 21 to rotate to complete the unlocking action. After the key 3 is done with unlocking and turned back to a vertical position, the protrusion 232 of each of the lock plates 23 and the flange 242 of each of the washers 24 are aligned with one another again, and then the key 4 is pulled out of the lock core 2, the push plate 22 is no longer pushed by the key 4, the brake bolt plate 28 and the push plate 22 are pushed back to the original positions by the elastically restored compression spring 29 (as shown in FIGS. 6 and 7), so that the brake bolt plate 28 blocks the protrusion 232 of each of the lock plates 23 and the flange 242 of each of the washers 24 in the lock core shell 21 again, and therefore the lock plates 23 and the washers 24 cannot be rotated. When the key 4 is to be pulled out from the lock core 2, and the key 4 has not been completely pulled out of the lock core 2 (as shown in FIG. 10), with rotation being restricted by the protrusion 252 of the limiting plate 25 embedded in the embedding groove 201 of the lock core seat 20, the key 4 cannot be rotated arbitrarily in a process of being pulled out from the lock core 2, and can only be pulled out straight without turning, so the key 4 can be prevented from rotating when pulling out from the lock core 2, and the key hole 230 of each of the lock plates 23 in the lock core 2 will not be out of position, when the key 4 is inserted into the key hole 230 of each of the lock plates 23 again, the key 4 can be inserted smoothly.

By disposing the slide groove 212 and the push plate 22 on the inner bottom surface of the lock core shell 21 of the invention, when the key 4 is not completely inserted to reach the inner bottom surface of the lock core shell 21, the key 4 cannot be turned, which is capable of preventing the key 4 from being deformed or fractured caused by rotating the lock core 2 forcefully, prolonging a service life of the key 4 and the lock core 2 structure, and providing an excellent anti-theft efficacy. By disposing the limiting plate 25, the key 4 can be prevented from rotating when the key 4 is not completely pulled out of the lock core 2, so that the key hole 230 of each of the lock plates 23 in the lock core 2 will not be out of position, when the key 4 is inserted into the key hole 230 of each of the lock plates 23 again, the key 4 can be inserted smoothly.

In summary, the invention has indeed achieved the intended object and efficacy of use, and is more ideal and practical than the prior art. However, the above-mentioned embodiment is merely the specific description of the preferred embodiment of the invention, the embodiment is not intended to limit the claims of the invention, and all other equivalent changes and modifications completed without departing from the technical means disclosed in the invention should be included in the claims covered by the invention.

What is claimed is:

1. An anti-theft structure comprising:

a lock core comprising:

a lock core seat;

a lock core shell;

a positioning plate; and a latch lever l;

wherein an accommodating chamber is disposed in the lock core seat;

an inner wall surface of the accommodating chamber is provided with an embedding groove;

the lock core seat is provided with a key insertion hole;

the lock core shell is disposed in the accommodating chamber of the lock core seat;

a wall surface of the lock core shell is provided with a cutting groove and a notch;

a plurality of lock plates and a plurality of washers are alternately superimposedly provided in the lock core shell, each of the plurality of lock plates is provided with a key hole;

an outer edge of each of the plurality of lock plates is provided with an arc notch, the outer edge of each of the plurality of lock plates is further provided with a protrusion, the protrusion is disposed in the notch of the lock core shell;

each of the plurality of washers is provided with a perforation;

an outer edge of each of the plurality of washers is provided with an arc notch, the outer edge of each of the plurality of washers is further provided with a flange, the flange is disposed in the notch of the lock core shell;

the positioning plate is disposed on an end portion of the lock core shell and placed into the accommodating chamber of the lock core seat;

a key hole is provided on the positioning plate, two corresponding long edges of the key hole of the positioning plate are provided with a convex body, respectively;

a part of the latch lever is embedded in the cutting groove of the lock core shell, and embedded in the arc notches of the plurality of lock plates and the plurality of washers, another part of the latch lever is embedded in the embedding groove of the lock core seat;

a key for inserting into the lock core, a guide groove being provided on two opposite wall surfaces of the key respectively;

a plurality of tooth grooves being provided on the wall surface of the key, and each of the plurality of tooth grooves corresponding to a position of each of the plurality of lock plates of the lock core respectively;

a wall surface of the accommodating chamber of the lock core seat is provided with an accommodating groove, one side of the accommodating groove is provided with a shaft hole, another side of the accommodating groove is provided with a groove, inside the accommodating chamber of the lock core seat is annularly provided with a ring groove;

an inner bottom surface of the lock core shell is provided with a slide groove, inside the slide groove is provided with a concave hole;

a push plate is provided in the slide groove of the lock core shell;

a perforation is provided on the push plate;

a limiting plate is disposed between the lock core shell and the positioning plate, and disposed in the accommodating chamber of the lock core seat, the limiting plate is provided with a key hole, two corresponding long edges of the key hole of limiting plate are respectively provided with an arc groove;

an outer edge of the limiting plate is provided with a protrusion, the protrusion is embedded in the embedding groove of the lock core seat;

a brake bolt plate is provided in the accommodating groove of the lock core seat, one side of the brake bolt plate is provided with a pivot shaft, the pivot shaft is disposed in the shaft hole of the lock core seat;

a compression spring is provided in the groove of the lock core seat, the compression spring pushes against the brake bolt plate;

a positioning baffle is provided in the accommodating chamber of the lock core seat and is located at a bottom of the lock core shell, the positioning baffle is provided with a through hole, the positioning baffle is protrudingly provided with a first baffle corresponding to a position of the embedding groove of the lock core seat, the positioning baffle is protrudingly provided with a second baffle corresponding to positions of the accommodating groove and the groove of the lock core seat;

a retaining ring is provided on an outer side of the positioning baffle, the retaining ring is embedded in the ring groove of the lock core seat; and the key is provided with a ring groove, and the ring groove of the key corresponds to a position of the limiting plate in the lock core.

* * * * *